US006317688B1

(12) United States Patent
Bruckner et al.

(10) Patent No.: US 6,317,688 B1
(45) Date of Patent: Nov. 13, 2001

(54) METHOD AND APPARATUS FOR ACHIEVING SOLE MEANS NAVIGATION FROM GLOBAL NAVIGATION SATELITE SYSTEMS

(75) Inventors: Juergen M. Bruckner, Cedar Rapids; Patrick Y. Hwang, Marion, both of IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/494,498

(22) Filed: Jan. 31, 2000

(51) Int. Cl.[7] .......................... G01C 19/00; G01C 21/00; G01S 13/00; G06F 17/00; G06F 19/00
(52) U.S. Cl. .......................... 701/213; 701/214; 701/215; 701/220; 701/221; 340/990; 340/995; 340/994; 342/353; 342/357.08; 342/357.14; 375/259; 375/377; 244/3.1; 244/3.2
(58) Field of Search ................................ 701/213, 214, 701/215, 220, 221; 340/990, 995, 994; 342/357.08, 357.14, 357.06, 357.05, 353, 352; 375/259, 357; 244/3.2, 3.1

(56) References Cited

U.S. PATENT DOCUMENTS

| 5,610,616 | * | 3/1997 | Vallot et al. | 342/357 |
| 5,617,317 | * | 4/1997 | Ignagni | 364/449.9 |
| 5,793,813 | * | 8/1998 | Cleave | 375/259 |
| 5,902,351 | * | 5/1999 | Streit et al. | 701/220 |
| 6,094,163 | * | 7/2000 | Chang | 342/357.06 |
| 6,127,970 | * | 10/2000 | Lin | 342/357.14 |
| 6,163,021 | * | 12/2000 | Mickelson | 244/3.2 |

FOREIGN PATENT DOCUMENTS

WO-9826304- * 6/1998 (DE) .

* cited by examiner

Primary Examiner—William A. Cuchlinski, Jr.
Assistant Examiner—Ronnie Mancho
(74) Attorney, Agent, or Firm—Nathan O. Jensen; Kyle Eppele

(57) ABSTRACT

A sole means global navigation apparatus adapted for use on an aircraft includes a GPS receiver to provide GPS measurement data and an inertial sensor system adapted to provide inertial translational and rotational data which during time periods is independent of the GPS position data. A navigation system coupled to both of the GPS receiver(s) and the inertial sensor system determines a navigation solution as a function of both the condition of the GPS satellite data and the uncertainty in the Inertial data. An augmentation system coupled to the navigation solution determining system is used to increase the accuracy and/or integrity of the GPS/inertial sensor, thereby achieving style means navigation requirements.

15 Claims, 7 Drawing Sheets

METHOD AND APPARATUS FOR ACHIEVING SOLE MEANS NAVIGATION FROM GLOBAL NAVIGATION SATELITE SYSTEMS

FIELD OF THE INVENTION

The present invention relates to navigation systems and apparatus. More particularly, the present invention relates to methods and apparatus for achieving sole means navigation using global positioning system (GPS) signals.

BACKGROUND OF THE INVENTION

The Global Positioning System (GPS) consists of a constellation of globally-dispersed satellites with synchronized atomic clocks that transmit radio signals. Time, as maintained by each satellite, is embedded in the transmitted radio signal of each satellite. The difference between the time embedded in a satellite's radio signal and a time measured at the point of reception of the radio signal by a clock synchronized to the satellite clocks is a measure of the range of the satellite from the point of reception. Since the clocks in the system cannot be maintained in perfect synchronism, the measure of range is referred to as "pseudorange" because it includes both a satellite clock error and the clock error at the point of reception.

Each satellite transmits, in addition to its clock time, its position in an earth-fixed coordinate system and its own clock error. A user, by measuring the pseudoranges to four satellites and correcting the pseudoranges for the satellite clock errors, can first of all determine his actual range to each satellite and his own clock error. The user can then determine his own position in the earth-fixed coordinate system, knowing his range to each of the four satellites and the position of each satellite in the earth-fixed coordinate system.

The GPS satellites may be an unsatisfactory source of navigation information. A slowly increasing range bias error can occur due to satellite clock faults or due to errors in the uploaded data, which may not be detected or corrected for several hours. The Federal Aviation Authority (FAA) requires that, even for approval as a supplemental navigation system, the system have "integrity" which is defined by the Federal Radio Navigation Plan (U.S. Dept. of Defense, DOD-4650.4 and U.S. Dept. of Transportation, DOT-TSC-RSPA-87-3 1986, DOT-TSC-RSPA-88-4 1988) as the ability to provide timely warnings to users when the system should not be used for navigation. For sole means of navigation, the system must also have sufficient redundancy that it can continue to function despite failure of a single component. Because navigational integrity is a critical component of an aircraft flying in civil airspace, methods have been developed for assuring that minimum integrity standards are met. Currently, there are three types of solutions available to carry out this function, each achieving different degrees of success.

(1) "Receiver autonomous integrity monitoring" (RAIM) is known wherein a receiver makes use of redundant satellite information to check the integrity of the navigation solution. With the present GPS constellation, there are insufficient satellites to provide worldwide RAIM coverage unless other satellite navigation sources or altimetry are included. To detect a satellite failure using RAIM requires that at least five satellites with sufficiently good geometry be available. For a sole means of navigation, it is also necessary to isolate erroneous satellites and to be able to navigate with the remaining satellites. Given the predetermined level of integrity and acceptable level of false alarm, the usefulness or shortcomings of RAIM is assessed by its availability to the user for a given protection limit dictated by the phase of flight. The availability numbers, which have been widely researched and published for the operational GPS satellite constellation and the visibility geometries it provides, are less than sufficient for sole means in oceanic operation and even worse for enroute, terminal and non-precision approach operations.

(2) Another known solution utilizes GPS satellites augmented with a high-quality Inertial Reference System (IRS). One such example is the Litton AIME solution described in U.S. Pat. No. 5,583,774 to Diesel entitled ASSURED-INTEGRITY MONITORED-EXTRAPOLATION NAVIGATION APPARATUS, which is herein incorporated by reference. A high-quality IRS utilizes the inertial sensors of a high quality inertial measurement unit (IMU) to maintain an inertial navigation solution When augmented by additional information from a high quality IRS, the availability of RAIM improves considerably to the point where the above limitations are negated, except for precision approach. However, this method relies heavily on the high stability characteristics of the IRS. To effectively augment the RAIM, the IRS must be independent of the GPS (unaided by GPS) over a rather long duration of time (20–30 minutes). This requires a very high quality IMU (with a gyro drift of less than 0.01 degrees per hour), since an unaided tactical-grade inertial measurement unit (with a gyro drift rate of 1–10 degrees per hour) solution becomes unusable in minutes.

(3) The FAA's Wide Area Augmentation System (WAAS) is another potential solution for providing integrity via ground monitoring by an elaborate network of stations and communications via geostationary satellites. Similar systems are under development in Europe (EGNOS) and Japan (MTSAT). However, all these solutions are subject to coverage limitations. In the Oceanic or Arctic phases of flight, this problem is even more significant and apparent because the lack of any other navigation.

(4) Alternate satellite navigation systems are under development which are comparable to GPS capability as stand alone systems but can be used in conjunction with GPS to provide augmented lines of position sources. These include, the Russian GLONASS (with a partial constellation in orbit) and the proposed European Galileo (which is under design). They are designed to be standalone systems with integrity limitations similar to GPS.

SUMMARY OF THE INVENTION

A sole means global navigation apparatus adapted for use on an aircraft includes a GPS receiver to provide GPS measurement data and an inertial sensor system adapted to provide inertial translational and rotational data which during time periods is independent of the GPS position data. A navigation system coupled to both of the GPS receiver(s) and the inertial sensor system determines a navigation solution as a function of both the condition of the GPS satellite data and the uncertainty in the inertial data. An augmentation system coupled to the navigation solution determining system is used to increase the accuracy and/or integrity of the GPS/inertial sensor, thereby achieving sole means navigation requirements.

DETAILED DESCRIPTION OF AN ILLUSTRATIVE EMBODIMENT

Figure 1:
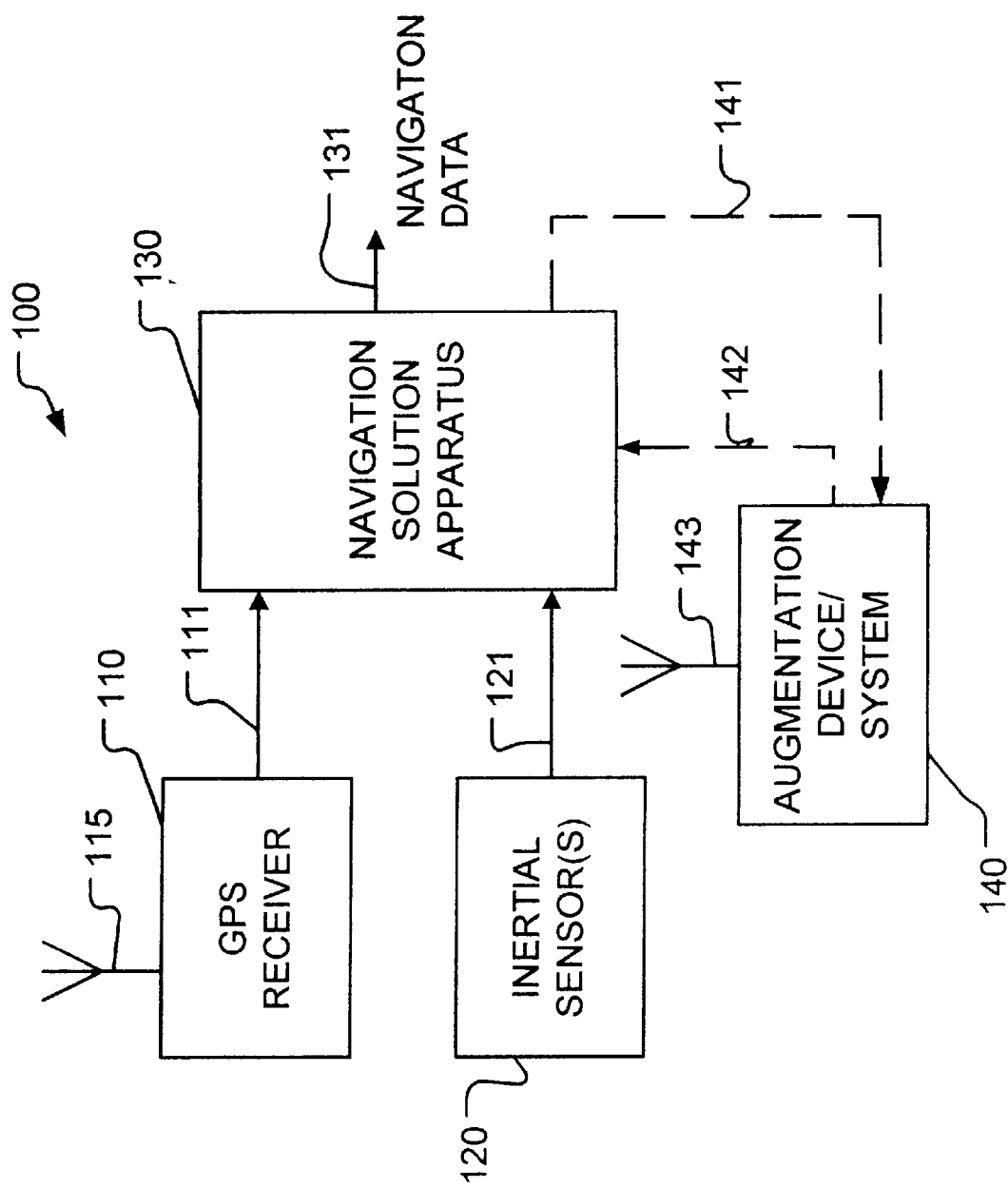
FIG. 1 is a block diagram illustrating a sole means navigation system having improved integrity in accordance with embodiments of the present invention.

FIG. 1 is a block diagram illustrating sole means navigation system 100 in accordance with embodiments of the present invention. Navigation system 100 includes GPS receiver 110, inertial sensors/system 120, navigation solution apparatus 130 and augmentation devices/system 140 (hereafter augmentation system 140). GPS receiver 110 receives satellite positioning signals from multiple GPS satellites using antenna or antenna array 115. GPS receivers can, in some embodiments (for example the embodiment illustrated in FIG. 2), have antenna 115 and antenna 116 (shown in FIG. 2) to form a multi-antenna GPS system. Based upon the received satellite signals, GPS receiver 110 provides as an output GPS measurement data 111 to navigation solution apparatus 130 as is known in the art. GPS measurement data may constitute a complete navigation solution (position, velocity, acceleration, time) or in the alternative, satellite specific data (including but not limited to code phase, carrier phase and down linked satellite data). Measurement data 111 can include GPS attitude data for the aircraft.

Inertial sensors/system (hereafter inertial sensors) 120 can be an IRS using an IMU and its associated inertial sensors. In the alternative, inertial sensors 120 can include only the IMU and/or inertial sensors. Inertial sensors 120 provide inertial measurement or navigational data 121 as a separate source of information for use by navigation solution apparatus 130 in generating navigation data 131.

Navigation solution apparatus 130 includes a suitably programmed processor to utilize the redundant position information or measurement data 111 and 121 provided by GPS receiver 110 and inertial sensors 120 to generate navigation data 131 with sufficiently high integrity to serve as a sole navigation source. Navigation solution apparatus 130 implements modified RAIM or similar algorithms to increase the integrity of the GPS receiver positioning information, which can suffer due to the lack of redundancy and integrity in the GPS satellites. A description of RAIM modifications for coasting is provided later. In order to allow the use of a lower quality or tactical grade inertial sensors 120, as compared to the high quality IRS required in the prior art, system 100 utilizes augmentation system 140 to increase the integrity of the navigation data provided by navigation solution apparatus 130. Generally, by way of example, a high quality IRS utilizes gyros which exhibit drift of no more than about (0.01 degrees per hour. The present Invention allows the use of lower cost tactical grade inertial sensors which typically exhibit drift of between about 1 degree and about 10 degrees per hour. Via a data link antenna 143 or other communication links, apparatus 130 can provide feedback 141 to augmentation system 140 for initialization, control, or other purposes. Augmentation system 140 provides augmenting data and/or control signals 142 to navigation solution apparatus 130. Augmentation system 140 can take many forms, some of them integral with GPS receiver 110, inertial sensors 120 or navigation solution apparatus 130.

Figure 2:
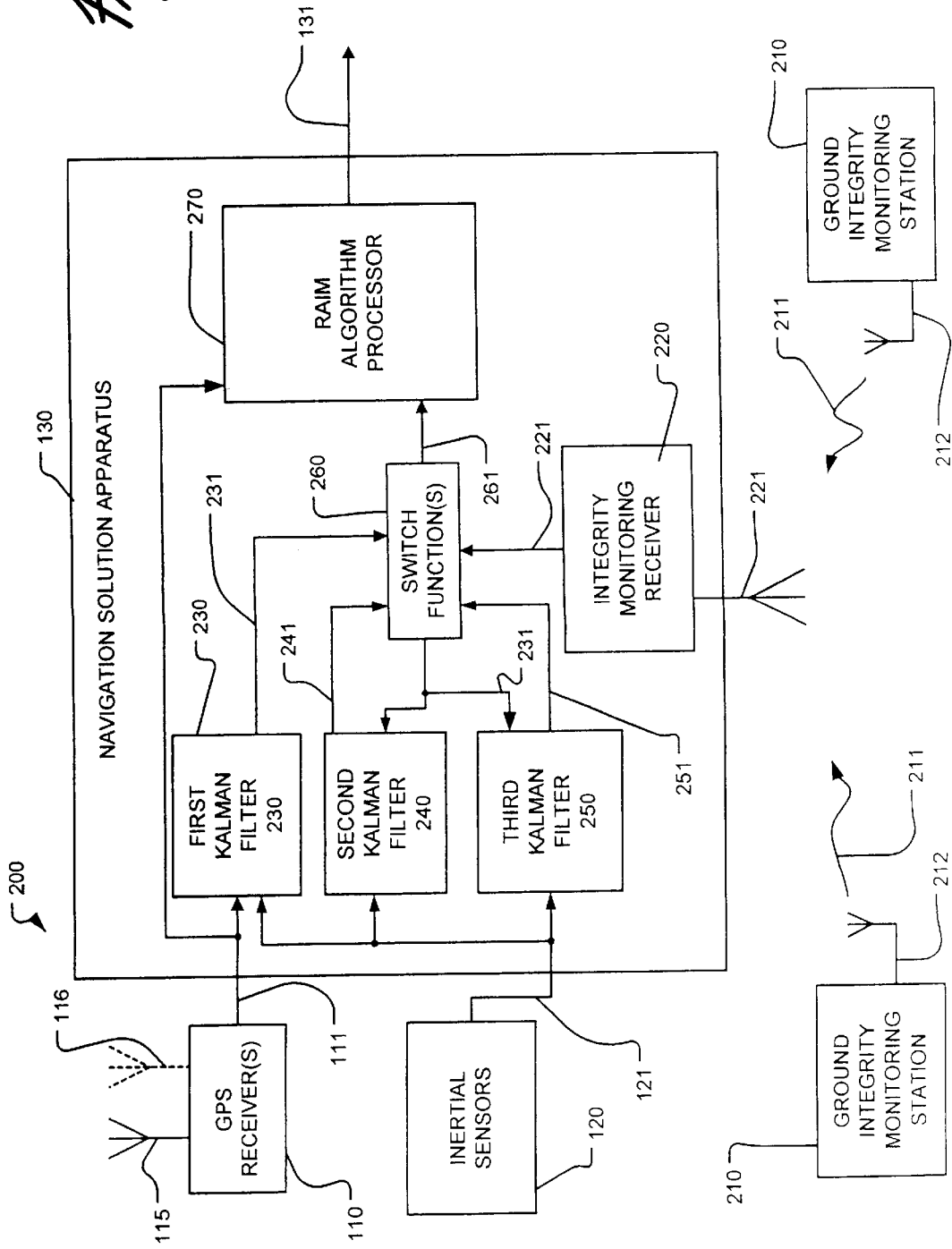
FIG. 2 is a block diagram illustrating an external integrity monitor embodiment of the sole means navigation system illustrated in FIG. 1.

FIG. 2 illustrates navigation system 200, which is first more particular embodiment of navigation system 100 illustrated in FIG. 1. In sole means navigation system 200, augmentation system 140 includes multiple ground integrity monitoring stations 210 positioned on the earth, as well as integrity monitoring receiver 220 positioned on the aircraft and illustrated diagrammatically as being part of apparatus 130. In this embodiment, which utilizes complementary inertial/ground integrity monitoring (CIGRIMS), navigation processor 270 implements modified RAIM algorithms or functions enhanced by inertial sensors 120 as in the prior art. However, low-quality inertial sensors 120 are used instead of high-quality ones. This means that, as an Independent positioning source, the inertial sensors are only capable of detecting a GPS satellite failure that becomes prominent over a short time interval. If the failure takes a longer time to become prominent and the GPS satellite geometry is insufficient to detect it, then the ground monitoring segment provided by stations 210 and receiver 220 plays an important role in helping to catch the failure.

Stations 210 transmit augmentation data and/or control signals 211 from antennas 212 to antenna 221 of receiver 220. The extra time that the low-cost inertial sensors buy allows for a relaxation in the time-to-alert requirement for the ground segment. This in turn allows for the use of lower-bandwidth communication links between the ground stations 210 and the aircraft (receiver 220). Examples of lower bandwidth communications links which can be used to communicate from stations 210 to receiver 220 include, for example, HF or SATCOM data radios. Other types of communication links can be used as well.

In the ground stations 210, a RAIM-like test is used to identify any satellite failure. The ground RAIM integrity model need only have one degree of freedom in the clock bias error, with the three position error components assumed to be zero. The ground integrity monitoring function may be carried out with a network of local-area differential base stations functioning as stations 210. This network need not be as complex as the proposed WAAS monitoring network because it is only expected to detect and identify satellite failures, and not to provide observations for differential corrections. Stations 210 transmit signals 211 which are indicative of whether or not a satellite failure has been detected. Stations 210 are discussed below in greater detail.

As in some prior art systems, in the CIGRIMS navigation system 200 illustrated in FIG. 2, inertial sensors 120 are intended to be an independent source of position information or measurements 121 to augment the usual satellite measurement data 111 that feeds the modified RAIM algorithms implemented by processor 270. Position information is provided to processor 270 using Kalman filter functions and switch functions. Although FIG. 2 illustrates Kalman filters 230, 240 and 250, those of skill in the art will understand that the Kalman filter functions can be implemented using a single appropriately programmed processor, such as processor 270. The GPS receiver 110 provides GPS measurement data 111 to first Kalman filter 230, and optionally to processor 270. The filtered GPS positioning information or measurement data output 231 of Kalman filter 230 can be used by processor 270 (through switching functions 260) during implementation of the modified RAIM algorithms. GPS/IMU data 231 from the first Kalman filter 230 is also switched into each of Kalman filters 240 and 250 by the switching function 260.

Figure 4:
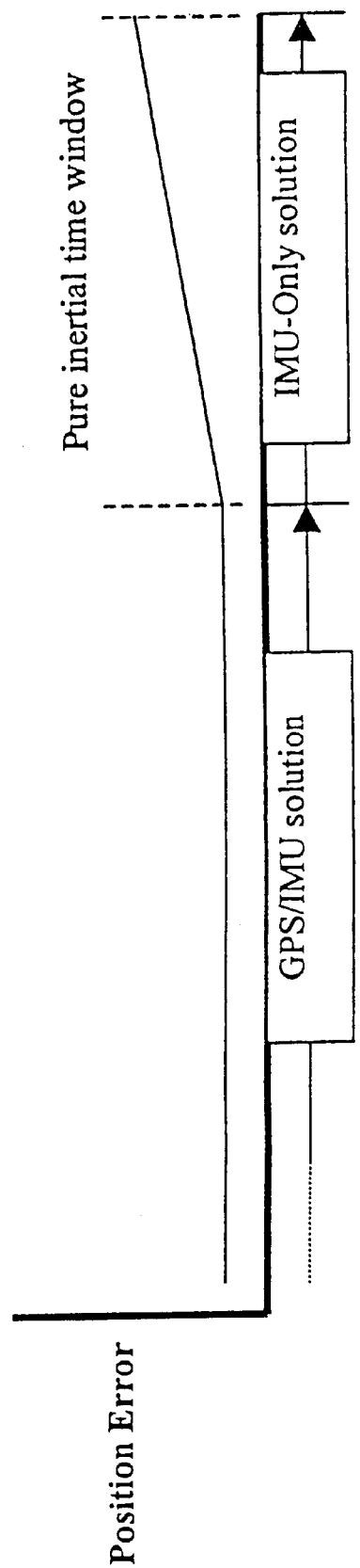
FIG. 4 is a plot illustrating the position error growth of GPS/IMU and IMU only navigation solutions.

In order to be "independent", a pure inertial solution must be maintained over brief durations of fixed time windows in addition to the usual GPS/IMU solution (i.e., inertial system aided with GPS data). At the start of such a time window, the pure inertial solution provided using data 121 is an extension of the GPS/IMU solution up to that instance, where it is assured that the CPS data included in the solution contains no failures. Within the time window, the pure inertial solution, even as its accuracy degrades, provides additional information to the modified RAIM solution. The position errors of the GPS aided inertial solution and of the inertial only solution are illustrated in FIG. 4. In effect, this inertial information amounts to additional horizontal position information.

The pure inertial time window starts at an instance known to be free of satellite failure, with satellite failure verified by at least one of the multiple ground monitoring stations 210. To use a slow communication link between stations 210 and receiver 220, significant latency in receiving the satellite failure verification from the ground will result. To overcome this, embodiments of the present invention utilize separate Kalman filters 240 and 250 coupled to inertial sensors 120 to maintain two staggered pure inertial time windows in parallel. Kalman filter 240 provides filtered inertial position or measurement data 241 and Kalman filter 250 provides filtered inertial position or measurement data 251. Under the control of signal 221 from receiver 220, switch 260 couples one of inertial data 241 and inertial data 251 to RAIM processor 270 at a time. As understood by those of skill in the art, use of switch 260 is diagrammatic, and the switch function can be implemented in software within processor 270.

Figure 5:
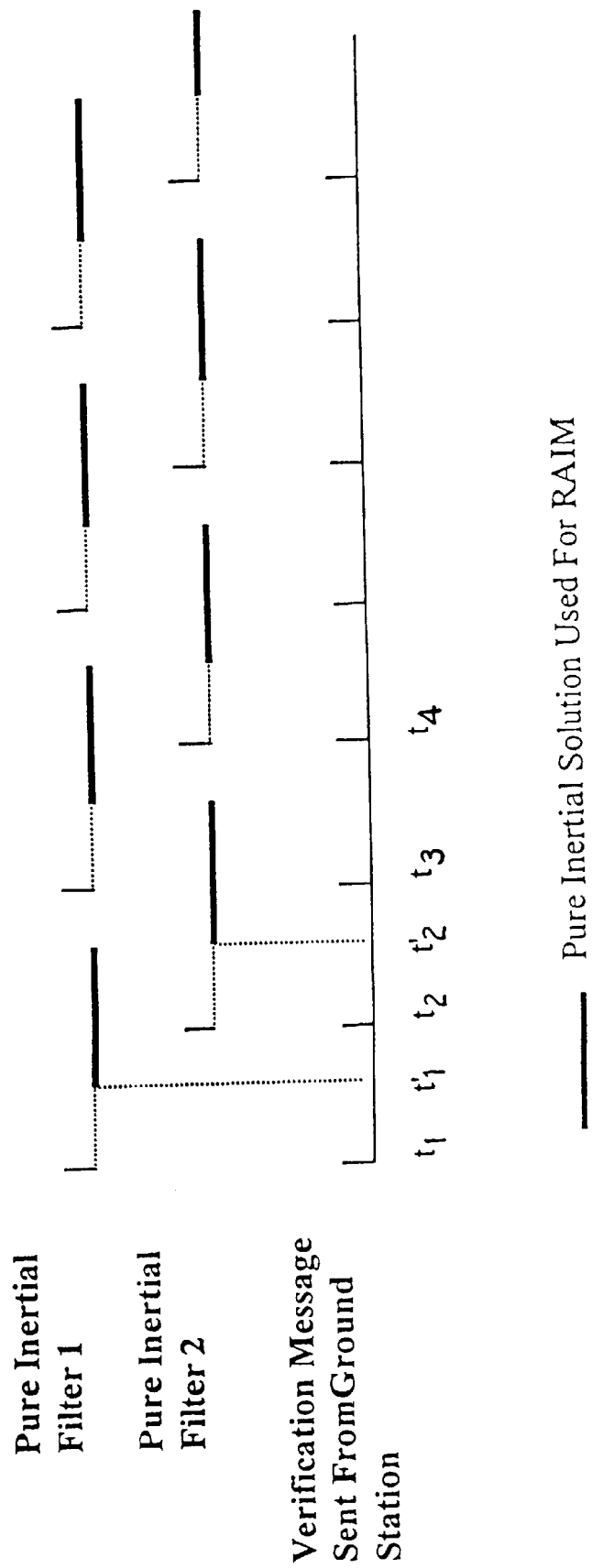
FIG. 5 is a timing diagram illustrating one method of improving integrity of the sole means navigation system illustrated in FIG. 2.

The two sets of pure inertial solutions are derived by Kalman filters 240 and 250 from a continuously-running GPS/IMU solution. The pure inertial solution maintained by one of the two filters is scheduled to start at every other start of a verification message window. This is illustrated in FIG. 5. At $t_1$ if a ground station has not detected a failure, a verification message to this effect is transmitted by the ground station. At the same time in system 200, the GPS/IMU solution at time $t_1$ is spun off into a pure inertial solution 241 using Kalman filter 240. This solution however is not used to augment the RAIM until time $t'_1$ when the verification message from the ground station is received by the receiver 220. Solution 241 remains to be used by the RAIM processor 270 until time $t'_2$ when a new verification message is received from the ground station. At that instance, solution 241 from filter 240 is discarded and replaced by solution 251 from filter 250, a new pure inertial solution that was started at time $t_2$. In this arrangement, the ground transmissions are scheduled only on a periodic basis even when a satellite failure is detected in between transmissions.

Referring back to FIG. 3, as discussed above, the ground monitoring stations 210 can be local-area differential base stations of the type known in the art, but with the added functionality of integrity monitoring. However, the differential correction function is not necessary in CIGRIMS systems of the present invention. On current base stations, additional software can be programmed to run RAIM in parallel with the differential correction functions. Although the base stations can implement the standard RAIM concept used in the airborne receiver, the problem is constrained to one with a known position. The RAIM state vector can be reduced to a single clock error state. In this case, the current Horizontal Integrity Limit and Vertical Integrity Limit parameters become redundant in the reformulation since the problem no longer has a dependency on satellite geometry.

Figure 3:
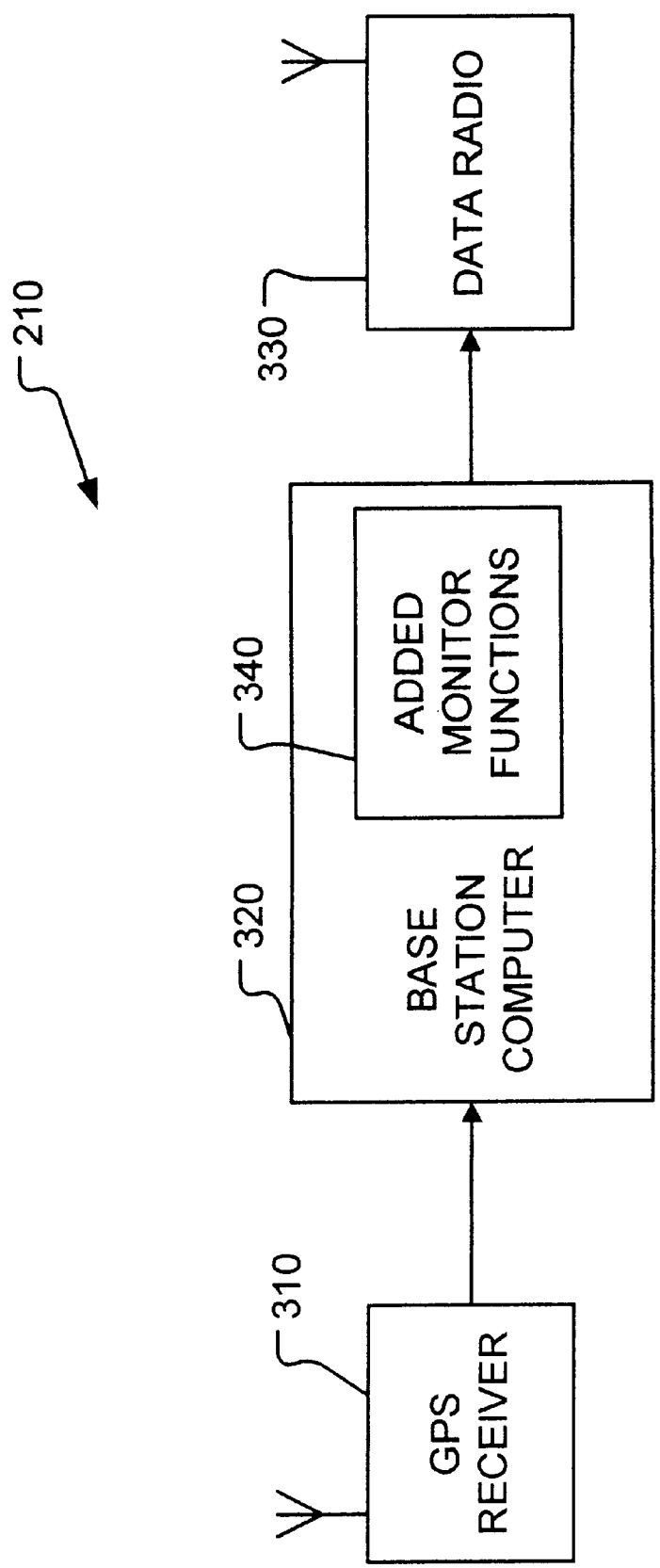
FIG. 3 is a block diagram illustrating one embodiment of the ground integrity monitoring stations illustrated in FIG. 2.

In FIG. 3, base station 210 is shown to include a GPS receiver 310, a processing computer 320 and a data radio 330. The data radio may be HF, Satcom or other media. Computer 320 runs differential base station software that is modified to include the new monitor function 340. The software can be modified to directly output newly-defined integrity messages, in lieu of differential corrections message. Base station 210 can be adapted to transmit, via radio 330, broadcast messages containing only a small amount of data pertaining to satellite integrity. There are three possible states for each satellite: pass, fail, and unmonitored. A prototype message can accommodate at least 32 GPS satellites. More space can be allocated for growth in the future, perhaps to also accommodate other GNSS systems as well.

The Automatic Link Establishment (ALE) protocol, MIL STD 188-141A, is an extremely robust, unclassified waveform that supports a broadcast (one-to-many) HF data link and which can be used for transmission of the integrity message from base stations 210. The protocol has link establishment signaling, layered forward error correction (FEC), data interleaving, and additional layered message error detection capability. The ALE standard is in use by military and commercial customers with vendors worldwide offering products that support the ALE standard (i.e. MIL STD 188-141A). Using the ALE waveform and base station GPS time, the transmissions of each station can be assigned unique frequency-time slots for each broadcast. The operational frequencies and time slots are predefined and contained in a database within each GPS base station and airborne receiver. This permits each base station to operate independently of all other stations worldwide.

Figure 6:
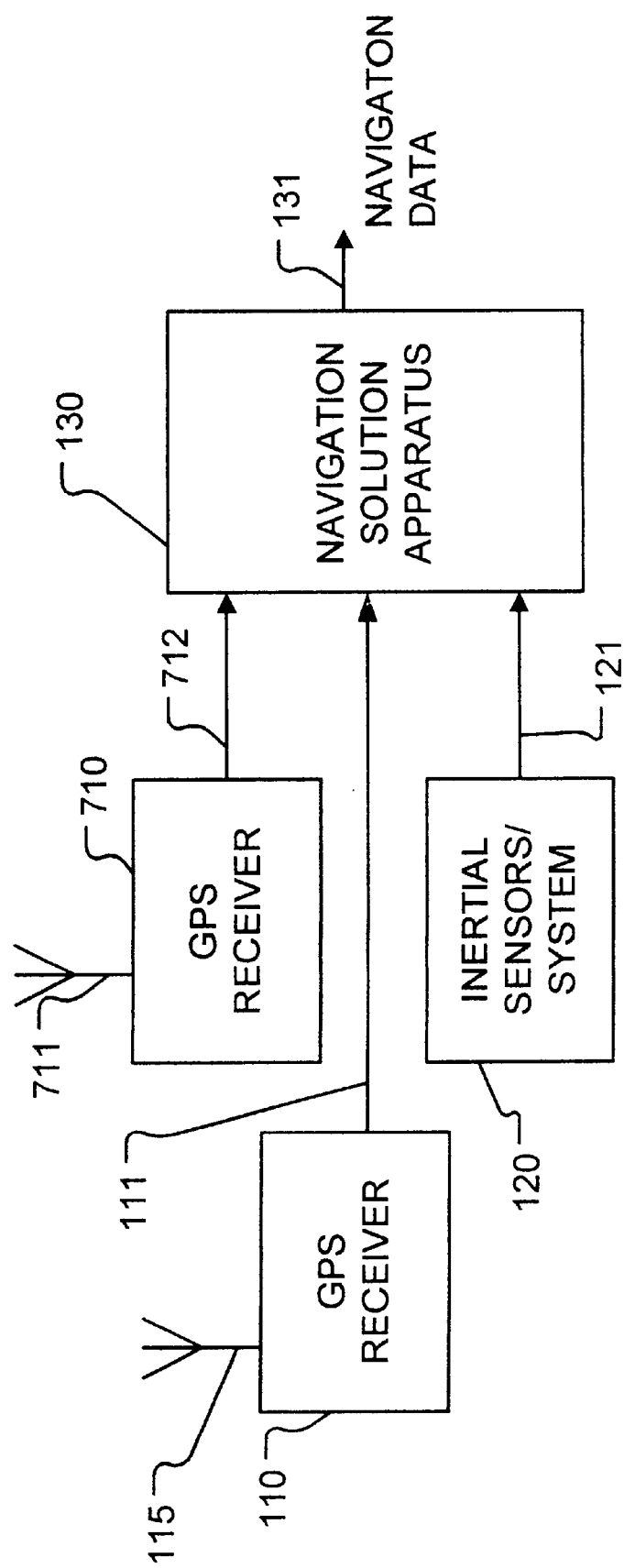
FIG. 6 is a block diagram illustrating a second dual GPS receiver embodiment of the sole means navigation system illustrated in FIG. 1 which permits direct attitude determination.

FIG. 6 is a block diagram illustrating GPS navigation system 700, which is a second more particular embodiment of navigation system 100 illustrated in FIG. 1. In system 700, augmentation system 140 (shown in FIG. 1) includes one or more additional GPS receivers or systems 710 to provide GPS attitude determining capability. GPS receiver 710 includes antenna 711 and provides measurement data 712. Although illustrated as separate GPS receivers 110 and 710, the GPS attitude data can be provided in some embodiments by a single multi-antenna GPS receiver. Multi-antenna GPS systems 110 and 710 provide data for a GPS attitude solution in the navigation solution apparatus 130. During the time periods in which inertial sensors 120 provide inertial data 121 without the use of GPS data from GPS receiver 110, the navigation system 130 can utilize multi-GPS to form an attitude solution to produce navigation data 131 with increased accuracy. Within navigation solution apparatus 130, Kalman filter functions are implemented to filter data 111 and data 121 for use in a RAIM algorithm processor in a manner similar to that discussed above with reference to FIGS. 1 and 2. However, unlike the embodiment illustrated in FIG. 2, navigation system 700 does not require redundant Kalman filtering of the inertial data.

An aspect of the potential contribution of a multi-antenna GPS attitude solution can be further explored. The slowly-drifting ramp-type error that is the most difficult to detect with RAIM originates from a slow buildup in an error in the pseudorange. The multi-antenna solution is a differential arrangement whereby this error in the pseudorange, common to the measurements at both antennas, simply gets eliminated. To augment RAIM with an independent position source of data, a "coasting" solution that is unaided by GPS position/velocity must be used. This coasting solution remains independent of GPS position data even when aided by multi-antenna GPS attitude data. Attitude-aided coasting solutions are unaffected by the type of GPS failure for which isolation is sought.

GPS attitude is derived from carrier phase measurements. In this area, the failure mode that needs protection against is very different from that encountered in the standard GPS navigation problem. RAIM is designed to protect against gradually ramping errors that creep into the GPS pseudorange measurements. In the differential arrangement of a two-antenna GPS attitude system, such errors are common to both GPS sensors and thus eliminated. Rather, the use of carrier phase measurements introduces an integer-cycle ambiguity that is prone to mistracking when signal strengths are weak or when subject to high tracking dynamics. This type of tracking error, known as cycle slip, occurs because the signal tracking behavior at different antennas are independent of each other. A different form of cross-checking at the solution level that is very similar to RAIM can be formulated to detect and isolate cycle slip errors. One method of detecting cycle slip errors is described in co-pending and commonly assigned application Ser. No. 09/313,146, filed Feb. 19, 1998, of P. Hwang, entitled SYSTEM AND METHOD FOR HIGH INTEGRITY DETECTION AND CORRECTION OF CYCLE SLIP AND A CARRIER PHASE-RELATED SYSTEM, which is herein incorporated by reference. Since its theoretical underpinning is based on RAIM, it is called Kinematic RAIM or KRAIM. System availability of KRAIM to detect the smallest error of one cycle slip based on the current GPS constellation can be enhanced by the use of short-term rotation rate information from the inertial sensors 120.

Figure 7:
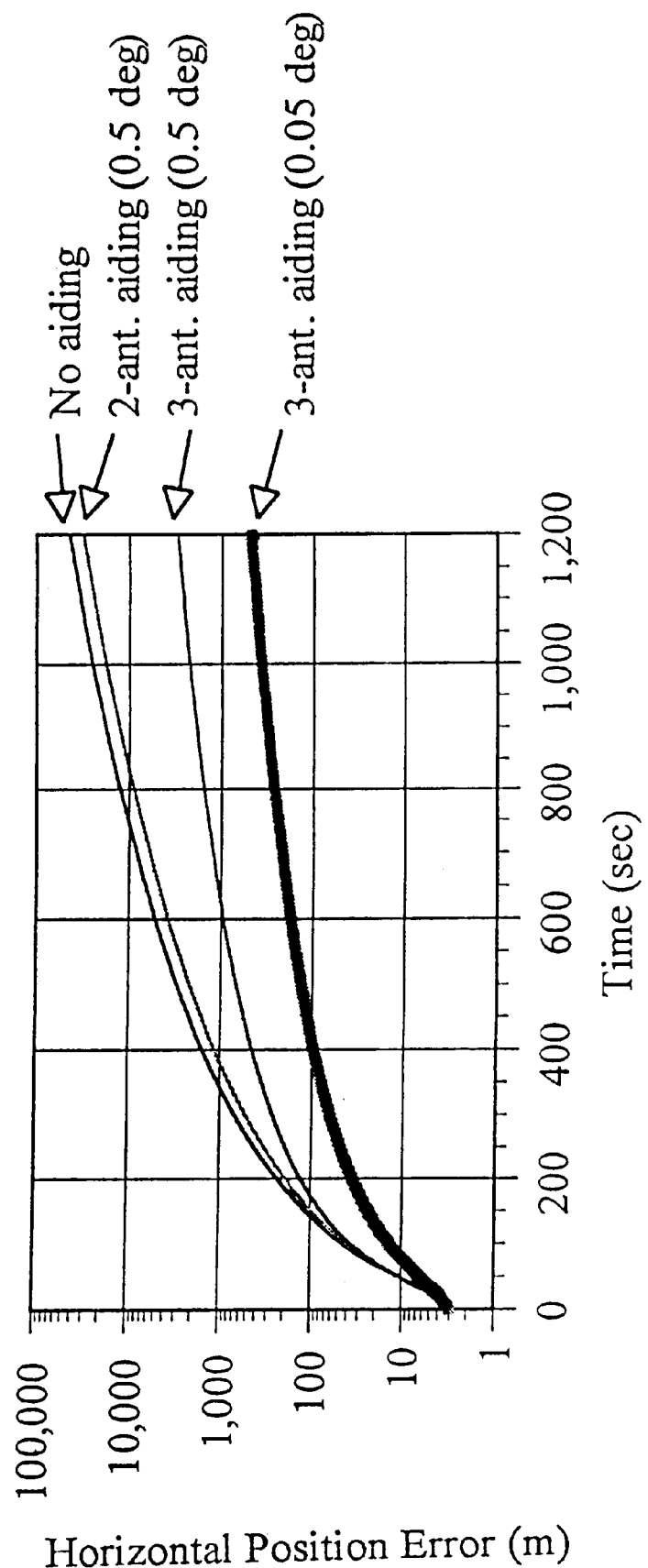
FIG. 7 is a plot illustrating simulations of IMU position error growth in the presence of multiple-antenna GPS attitude determination.

The position and velocity terms in the attitude-aided coasting solution will still grow without bounds but do so at a slower rate than they would in the pure inertial solution. A simulation using a simplified GPS/IMU (tactical grade) model was conducted to illustrate the comparative benefits of the antenna aiding. The results of the simulation are illustrated in FIG. 7. The simulation results clearly show that the greatest benefit is derived from a 3-antenna aiding solution with very good attitude accuracy.

The RAIM algorithms described above can be a type of RAIM modified from standard RAIM. A description of standard RAIM follows. The formulation for the standard RAIM mechanization assumes a linearized relationship between a vector of satellite pseudorange measurements $\rho_k$ and a vector $s_k$ of position and clock error states as shown in Equation 1:

$$z = \rho - \rho^* = H(s - s^*) + b + v = Hx + b + v \quad \text{Equation 1}$$

where $\rho^*$ is a "predicted" pseudorange to the nominal location $s^*$;

H is a matrix of unit direction vectors that relates a perturbation in the measurement $\rho$ to that in the solution x $(=s-s^*)$;

b is a vector of "failure" bias that can be assumed to contain one satellite failure at a time;

v is a measurement noise vector.

In the linearized relationship, if the dimensionality of z is larger than that of x then there exists an extra degree or degrees of freedom to test the cross-consistency of the measurement data as related to the solution x. The ability of any statistical test to detect an error in the measurement (single error assumed) is dependent on the size of the "normal" error, and the time-varying relationship contained in H that is dictated by satellite geometry. This ability to detect a failure (or detectability) within a given level of confidence determines if the system is available or not. Overall system availability ultimately underscores the usefulness of the system.

The system's detectability at any one time can be assessed strictly from the satellite geometry information contained in H. The analysis evaluates, for a single failure in each satellite, the sensitivity of the test statistic to the effect of the failure in the position domain. Then, after considering all visible satellites, the worst case, i.e. the situation with the poorest sensitivity, is picked out. That situation yields the largest position error that can occur without detection by the test statistic.

A modification to the standard RAIM described above is needed for the contribution we seek from the inertial augmentation. This takes the form of taking two components of position (horizontal) from the IMU solution, and one component of altitude from a baro-altimeter, and feeding these three as additional "measurements" into the RAIM computation.

The augmented equation can be written as follows:

$$\begin{bmatrix} z \\ p \end{bmatrix} = \begin{bmatrix} H \\ J \end{bmatrix} x + \begin{bmatrix} b \\ 0 \end{bmatrix} + \begin{bmatrix} v_z \\ v_p \end{bmatrix} \quad \text{Equation 2}$$

This new linearized relationship now has a higher dimensionality than the original relationship. By and large, the standard RAIM algorithms can be modified to handle the extra "measurements" in sub-vector p. This appended sub-vector p represents the contribution of the IMU coasting in providing an independent source of data that is related to the position vector x through J. The matrix J, that relates the appended sub-vector p to the solution vector x, is simply given by:

$$J = \begin{bmatrix} 1 & 0 & 0 & 0 \\ 0 & 1 & 0 & 0 \\ 0 & 0 & 1 & 0 \end{bmatrix} \quad \text{Equation 3}$$

The covariance matrix associated with the new augmented measurement noise vector $[v_z \; v_p]^T$ (from Eq. 2 where $v_z$ is a v from Eq. 1, and where $v_p$ is the error in the augmented measurement subvector p and is based on the quality of the inertial and baro data) has some non-trivial correlation structure due to the fact that the IMU (horizontal) and baro-altimeter (vertical) solutions, that make up the sub-vector p, are influenced by the GPS measurements contained in sub-vector z, at the start of the coasting interval. The derivation of this covariance matrix should be obvious to those who are skilled in the art.

Although the present invention has been described with reference to illustrative embodiments, workers skilled in the art will recognize that changes may be made in form and detail without departing from the spirit and scope of the invention. For example, while the present invention is described primarily with reference to the global positioning system, it can be used with other global navigational satellite systems (GNSS). Therefore, as used herein, the term GPS is intended to refer to any GNSS.

What is claimed is:

1. A global positioning system (GPS) navigation apparatus adapted for use on an aircraft, the apparatus comprising:
   a GPS receiver adapted to provide GPS measurement data;
   an inertial sensor adapted to provide inertial measurement data which is independent of the GPS measurement data;
   navigation solution determining means coupled to each of the GPS receiver and the inertial sensor for determining a navigation solution as a function of both the GPS measurement data and the inertial measurement data; and
   an augmentation system coupled to the navigation solution determining means wherein the augmentation system is adapted to reduce errors in the inertial measurement data used by the navigation solution determining means in a manner which is independent of the GPS measurement data provided by the GPS receiver.

2. The GPS navigation apparatus of claim 1, wherein the navigation solution determining means further comprises:
   a first Kalman filter coupled to the GPS receiver and adapted to filter the GPS measurement data to provide first filtered GPS data;
   a second Kalman filter coupled to the inertial sensor and adapted to filter the inertial measurement data to provide first filtered inertial data; and
   a processor adapted to implement receiver autonomous integrity monitoring algorithms using the first filtered GPS data and the first filtered inertial data to provide the navigation solution.

3. The GPS navigation apparatus of claim 2, and further comprising an integrity monitoring receiver adapted to receive integrity monitoring signals from a ground based satellite integrity monitoring station, the integrity monitoring signals being indicative of whether a satellite failure has been detected by the satellite integrity monitoring station.

4. The GPS navigation apparatus of claim 3, and further comprising:
   a third Kalman filter coupled to the inertial sensor and adapted to filter the inertial measurement data to provide second filtered inertial data; and
   wherein the navigation solution determining means is adapted to alternate between utilizing the first filtered inertial data and utilizing the second filtered inertial data in determining the navigation solution.

5. The GPS navigation apparatus of claim 2, wherein the augmentation system includes another GPS antenna system allowing GPS attitude data to be derived.

6. A global positioning system (GPS) navigation apparatus providing a sole source of navigation for an aircraft, the apparatus comprising:
   GPS receiver means for providing GPS measurement data;
   inertial sensor means for providing inertial measurement data which during time periods is independent of the GPS measurement data;
   navigation solution determining means for generating navigation data as a function of both the GPS measurement data and the inertial measurement data; and
   augmentation means for optimizing an accuracy of the inertial measurement data.

7. A method of generating navigation data using a global positioning system (GPS) navigation apparatus adapted for use on an aircraft, the method comprising:
   generating GPS measurement data using a GPS receiver;
   providing augmentation data independently of the GPS measurement data;
   generating inertial measurement data, which during time periods is independent of the GPS measurement data using an inertial sensor; and
   generating the navigation data as a function of both the GPS measurement data, the inertial measurement data, and the augmentation data.

8. The method of claim 7, and further comprising;
   applying Kalman filter functions to the GPS measurement data to provide first filtered GPS data;
   applying Kalman filter functions to the inertial measurement data to provide first filtered inertial data; and
   implementing receiver autonomous integrity monitoring (RAIM) algorithms using the first filtered GPS data and the first filtered inertial data to provide the navigation solution data.

9. The method of claim 8, and further comprising:
   applying Kalman filter functions to the inertial measurement data to provide second filtered inertial data; and
   receiving integrity monitoring signals from a ground based satellite integrity monitoring station, the integrity monitoring signals being indicative of whether a satellite failure has been detected by the satellite integrity monitoring station; and
   alternating between implementing the RAIM algorithms using the first filtered inertial data and the second filtered inertial data to determine the navigation solution.

10. The method of claim 7, wherein providing augmentation data further comprises receiving GPS attitude data from a multi-antenna GPS attitude system.

11. The method of claim 10, wherein generating the inertial data further includes generating the inertial data using the inertial sensor and as a function of the GPS attitude data during the time periods.

12. A global positioning system (GPS) navigation apparatus adapted for use on an aircraft, the apparatus comprising:
   a GPS receiver adapted to provide GPS measurement data;
   an inertial sensor adapted to provide inertial measurement data which is independent of the GPS measurement data;
   navigation solution determining means coupled to each of the GPS receiver and the inertial sensor for determining a navigation solution as a function of both the GPS measurement data and the inertial measurement data and wherein the navigation solution determining means further comprises:
      a first Kalman filter coupled to the GPS receiver and adapted to filter the GPS measurement data to provide first filtered GPS data;
      a second Kalman filter coupled to the inertial sensor and adapted to filter the inertial measurement data to provide first filtered inertial data;
      a third Kalman filter coupled to the inertial sensor and adapted to filter the inertial measurement data to provide second filtered inertial data; and a processor adapted to implement receiver autonomous integrity monitoring algorithms using the first filtered GPS data and the first filtered inertial data to provide the navigation solution and wherein the navigation solution determining means is adapted to alternate between utilizing the first filtered inertial data and utilizing the second filtered inertial data in determining the navigation solution and wherein the navigation solution determining means is adapted to alternate between utilizing the first filtered inertial data and the second filtered inertial data during consecutive windows of time, each of the consecutive windows of time starting at a time of receipt of the integrity monitoring signals by the integrity monitoring receiver;

an augmentation system coupled to the navigation solution determining means wherein the augmentation system is adapted to reduce errors in the inertial measurement data used by the navigation solution determining means in a manner which is independent of the GPS measurement data provided by the GPS receiver; and an integrity monitoring receiver adapted to receive integrity monitoring signals from a ground based satellite integrity monitoring station, the integrity monitoring signals being indicative of whether a satellite failure has been detected by the satellite integrity monitoring station.

13. The GPS navigation apparatus of claim 12, wherein the navigation solution determining means is adapted to determine the navigation solution as a function of a selected one of the first and second filtered inertial data, and wherein the navigation solution determining means is adapted to utilize a non-selected one of the first and second Kalman filters to begin a new pure inertial solution at a time corresponding to a next scheduled transmission of the integrity monitoring signals from the integrity monitoring station.

14. The GPS navigation apparatus of claim 13, wherein the first, second and third Kalman filters are implemented in the processor.

15. A method of generating navigation data using a global positioning system (GPS) navigation apparatus adapted for use on an aircraft, the method comprising:

generating GPS measurement data using a GPS receiver;

providing augmentation data independently of the GPS measurement data;

generating inertial measurement data, which during time periods is independent of the GPS measurement data using an inertial sensor;

applying Kalman filter functions to the GPS measurement data to provide first filtered GPS data;

applying Kalman filter functions to the inertial measurement data to provide first filtered inertial data;

applying Kalman filter functions to the inertial measurement data to provide second filtered inertial data;

implementing receiver autonomous integrity monitoring (RAIM) algorithms using the first filtered GPS data and the first filtered inertial data to substantiate the GPS measurement data, the augmentation data and the inertial measurement;

receiving integrity monitoring signals from a ground based satellite integrity monitoring station, the integrity monitoring signals being indicative of whether a satellite failure has been detected by the satellite integrity monitoring station;

alternating between implementing the RAIM algorithms using the first filtered inertial data and the second filtered inertial data to determine the navigation solution wherein alternating further comprises alternating between utilizing the first filtered inertial data and the second filtered inertial data during consecutive windows of time, with each of the consecutive windows of time starting at a time corresponding to a time of receipt of the integrity monitoring signals; and generating navigation data as a function of both the GPS measurement data, the inertial measurement data, and the augmentation data.

* * * * *